(Model.)

H. LINDSEY.
CORN AND COTTON CULTIVATOR.

No. 251,784. Patented Jan. 3, 1882.

Witnesses:
Willie Keston
C. Bellson

Inventor:
Hosea Lindsey

UNITED STATES PATENT OFFICE.

HOSEA LINDSEY, OF ASHEVILLE, NORTH CAROLINA, ASSIGNOR OF ONE-HALF TO EMO H. MERRIMON, OF SAME PLACE.

CORN AND COTTON CULTIVATOR.

SPECIFICATION forming part of Letters Patent No. 251,784, dated January 3, 1882.

Application filed May 16, 1881. (Model.)

*To all whom it may concern:*

Be it known that I, HOSEA LINDSEY, a citizen of North Carolina, residing at Asheville, in the county of Buncombe and State of North Carolina, have invented certain new and useful Improvements in Corn and Cotton Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
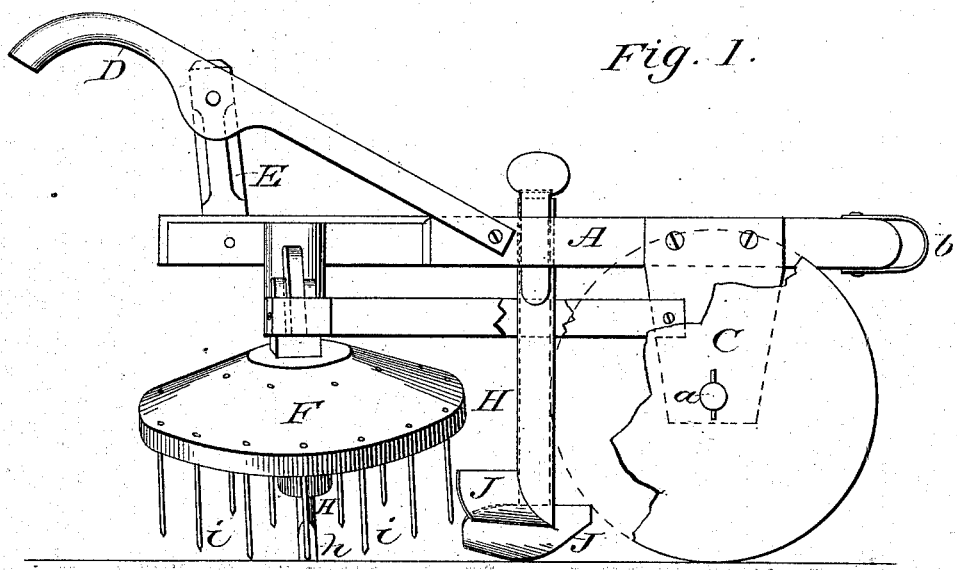
Figure 2:
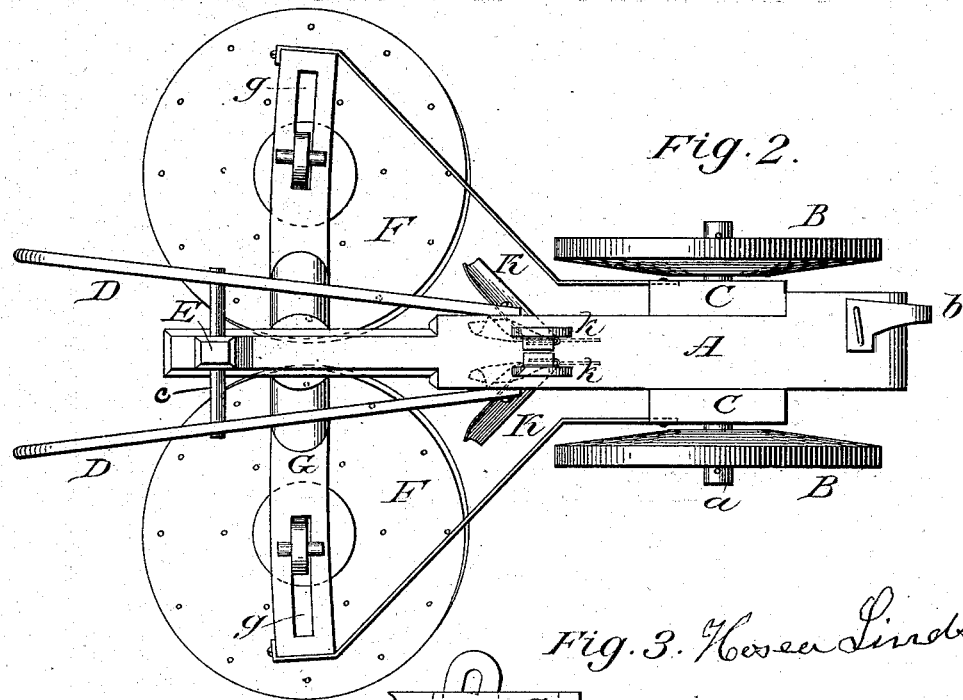
Figure 3:
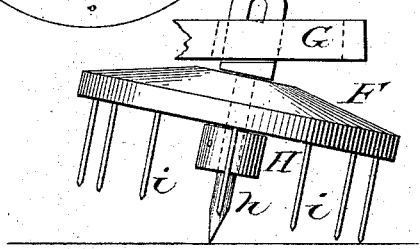

Referring to the drawings, Figure 1 is a side elevation of the cultivator with part of the braces and one of the wheels broken away. Fig. 2 is a plan view. Fig. 3 is a detail view of one of the harrows.

The same letters of reference refer to corresponding parts.

A is the beam. B B are the wheels, which rotate upon an axle, $a$, journaled in depending pieces or brackets C C, which are screwed or bolted to the beam, near the front end thereof. $b$ is a clevis attached to the front end of the beam. D D are the handles, the front ends of which are screwed or bolted to the sides of the beam, and are supported near their rear ends by a brace or support, E, which is mortised into the rear end of the beam. A stay-rod, $c$, extends from one handle to the other, passing through the top of the brace E, and holds the handles firmly in place.

To the under side of the beam, at its rear end, is firmly screwed a cross-bar, G, the ends of which are slotted, as at $g$ $g$, to receive the rotary harrows. The harrows are made with circular dome-shaped heads F F, around the peripheries of which are inserted the teeth $i$ $i$. Through the center of the circular heads F F are pointed rods $h$, which are somewhat longer than the teeth $i$ $i$.

A tubular collar, H, is fitted on the rod on the under side of the head, and a collar is also fitted to or forms a part of the rod on the top of the head. The upper collar is made to fit the slots in the ends of the cross-bar, and is also slotted and locked to the bar by means of a key or toggle passed through the slot in the collar above the cross-bar. One of the harrows is secured at each end of the cross-bar in the manner just described.

The plowshares and mold-boards J, two of which are used, are made in one piece. Scrapers K K are also secured to the standards to which the plows are attached. The standards extend upwardly through slots near the center of the beam, and are adjusted and held in any desired position by means of wedges $k$ $k$. By inserting the standards in the beam in one direction the plows cut the earth and turn it from the corn or cotton, as in plowing the first time, and the scrapers cut the grass and turn it from the cotton. By reversing the plows the earth is thrown toward the cotton in the second plowing. The harrows rotate and turn up the grass and pulverize the earth between the rows, and they may be made to rotate in either direction by changing or reversing the upright pieces in which they turn.

The cultivator is provided with suitable angular braces, which extend from the ends of the cross-bar G to the brackets which support the wheels on each side of the plow.

Having thus fully described my improvement, what I claim is—

1. In a corn or cotton cultivator, the central plows or cultivators, constructed substantially as described, in combination with two reversible and laterally-adjustable rotating harrows in the rear of the plows, substantially as set forth.

2. In a corn or cotton cultivator, the adjustable plows and scrapers, in combination with two laterally-adjustable rotating harrows in the rear of the plows, substantially as described.

In testimony whereof I have affixed my signature in presence of two witnesses.

HOSEA LINDSEY.

Witnesses:
F. A. GONDLEY,
JAMES P. SAWYER.